United States Patent
Tzempetzis et al.

(10) Patent No.: US 11,052,908 B2
(45) Date of Patent: Jul. 6, 2021

(54) PARKING ASSISTANCE FOR A MOTOR VEHICLE FOR PARKING ON PUBLIC AND PRIVATE LAND

(71) Applicant: Valeo Schalter und Sensoren GmbH, Bietigheim-Bissingen (DE)

(72) Inventors: Dimitrios Tzempetzis, Bietigheim-Bissingen (DE); Markus Heimberger, Bietigheim-Bissingen (DE); Stefanie Prinzhausen, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/760,717

(22) PCT Filed: Oct. 25, 2018

(86) PCT No.: PCT/EP2018/079229
§ 371 (c)(1),
(2) Date: Apr. 30, 2020

(87) PCT Pub. No.: WO2019/086315
PCT Pub. Date: May 9, 2019

(65) Prior Publication Data
US 2020/0254998 A1 Aug. 13, 2020

(30) Foreign Application Priority Data
Nov. 3, 2017 (DE) .................... 10 2017 125 710.1

(51) Int. Cl.
*B60W 30/06* (2006.01)
*G08G 1/01* (2006.01)
*G08G 1/14* (2006.01)

(52) U.S. Cl.
CPC .......... *B60W 30/06* (2013.01); *G08G 1/0145* (2013.01); *G08G 1/142* (2013.01); *G08G 1/147* (2013.01)

(58) Field of Classification Search
CPC ..... B60W 30/06; G08G 1/0145; G08G 1/142; G08G 1/147
(Continued)

(56) References Cited

U.S. PATENT DOCUMENTS

| 2014/0180523 A1 | 6/2014 | Reichel et al. |
| 2018/0150764 A1* | 5/2018 | Stenneth ............ G01C 21/3685 |
| 2019/0016331 A1* | 1/2019 | Carlson ................. B60W 30/06 |

FOREIGN PATENT DOCUMENTS

| DE | 102008027692 A1 | 12/2009 |
| DE | 102010023162 A1 | 12/2011 |
(Continued)

OTHER PUBLICATIONS

International Search Report issued in corresponding International Patent Application No. PCT/EP2018/079229, dated Feb. 18, 2019 (7 pages).
Written Opinion issued in corresponding International Patent Application No. PCT/EP2018/079229, dated Feb. 18, 2019 (7 pages).
German Search Report issued in corresponding German Application No. 10 2017 125 710.1, dated Jul. 27, 2018 (7 pages).

*Primary Examiner* — Daryl C Pope
(74) *Attorney, Agent, or Firm* — Osha Bergman Watanabe & Burton LLP

(57) ABSTRACT

The invention relates to a method for operating a parking assistance device (2) of a motor vehicle (1), comprising a) learning a parking trajectory (4) between an initial position (5) and a parked position (6) of the motor vehicle (1) by means of a computing unit (3) of the parking assistance device (2) in the case of parking which is controlled by a driver of the motor vehicle (1); b) checking whether the learnt parking trajectory (4) runs over public land (11) or over private land (12) in at least one respective section (13,
(Continued)

Figure 1:
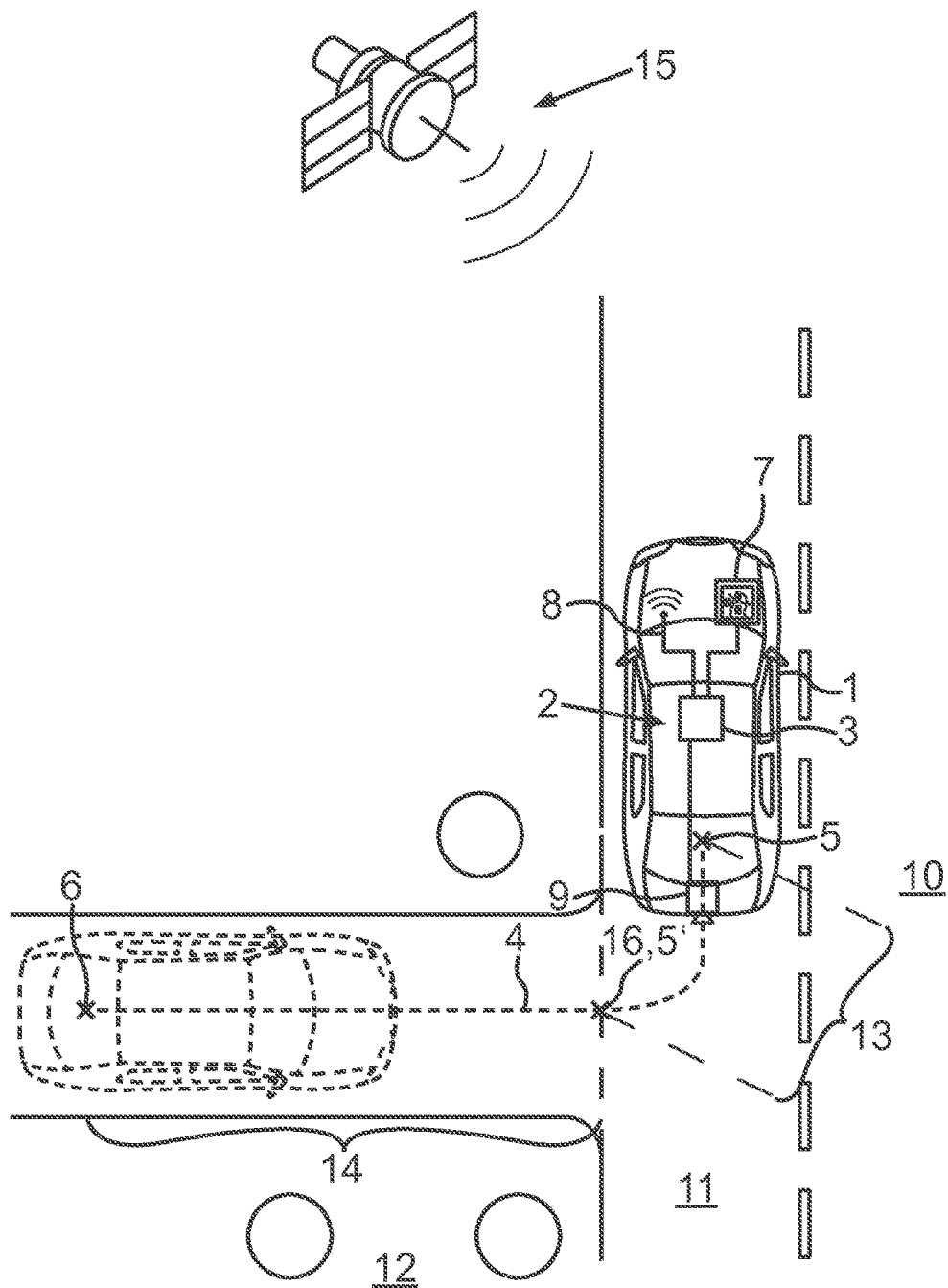

14); c) driverless parking of the motor vehicle (1) along the parking trajectory (4) exclusively in a section (14) of the checked parking trajectory (4) which runs over private land (12), in order to increase safety during a parking process which is assisted or carried out by the parking assistance device (2).

10 Claims, 2 Drawing Sheets

(58) Field of Classification Search
USPC ..... 340/932.2, 937, 901–905, 539.1, 539.11, 340/539.13
See application file for complete search history.

(56) References Cited

FOREIGN PATENT DOCUMENTS

| | | |
|---|---|---|
| DE | 102012008858 A1 | 11/2012 |
| DE | 102013015348 A1 | 4/2014 |
| DE | 102012112802 A1 | 6/2014 |
| DE | 102014224108 A1 | 6/2016 |
| DE | 102015202468 A1 | 8/2016 |
| DE | 102016001264 A1 | 9/2016 |
| DE | 102015209190 A1 | 11/2016 |
| DE | 102016211179 A1 | 3/2017 |
| EP | 2746138 B1 | 7/2015 |
| EP | 3217244 A1 | 9/2017 |

\* cited by examiner

PARKING ASSISTANCE FOR A MOTOR VEHICLE FOR PARKING ON PUBLIC AND PRIVATE LAND

The invention relates to a method for operating a parking assistance device of a motor vehicle. The invention also relates to a parking assistance device for a motor vehicle, having a computing unit for learning a parking trajectory between an initial position and a parked position of the motor vehicle in the case of parking which is controlled by a driver of the motor vehicle.

There are already a large number of parking assistance devices for assisting parking, that is to say carrying out parking in a partially or fully automated fashion, of motor vehicles. There are already parking assistance devices which store, for the motor vehicle, a trajectory which is travelled along during the parking process, and use said trajectory for later partially automatic or fully automatic parking. In this context, when the respective parking trajectory is being learnt different sensor information items from sensor units of the motor vehicle are typically used to obtain information about the surroundings, for example in the form of what are referred to as landmarks, and to orientate themselves in accordance with this information, for example the landmarks.

The surrounding information, for example the landmarks, can therefore be used during subsequent automated travel along the parking trajectory to determine a current position of the motor vehicle relative to the stored or learnt parking trajectory, and therefore to decide how the motor vehicle must be controlled so that it follows the parking trajectory and finally reaches a desired parked position. In this context, a correspondingly present obstacle on the stored trajectory can cause the method to be aborted or paused. Moreover, the trajectory can also be adapted to the effect that the motor vehicle drives around the obstacle. Conversely, in this context the learnt parking trajectory can also be implemented from the parked position back to the initial position at which the parking which was assisted by the parking assistance device started.

Overall it is therefore possible to ensure that, for example, a driver gets out of the motor vehicle, assumes this parking space automatically along a previously learnt parking trajectory, for example on private land of the driver, and when necessary moves out of the parking space again in reverse along the trained parking trajectory to the initial position in which the driver can then get into the vehicle again. In this context, the learnt parking trajectory between the initial position and the parked position can also comprise an equivalent alternative trajectory which deviates in certain areas from the original parking trajectory from the initial position to the parked position, for example in order to change an orientation of the motor vehicle on the parking trajectory in the form of a manoeuvre, so that after the partially automated or fully automated process of moving out of the parking space the motor vehicle then reaches the initial position or another position on the original parking trajectory, with an orientation which is opposed to that when parking.

For example, in this context, DE 10 2008 027 692 A1 discloses a method for assisting a driver of a vehicle during a parking process during which, after the driver has left the vehicle, said vehicle, automatically searches for a suitable parking area and parked there and/or if the driver requires the vehicle said vehicle automatically moves out of the parking area and picks up the driver automatically at a specific location.

DE 10 2016 001 264 A1 discloses a method for automatically driving a vehicle in a limited area, wherein a control unit which is mounted on the vehicle and is used for autonomous driving is controlled by an external control device via a vehicle interface. In this context, the vehicle-mounted control unit which is used for autonomous driving checks whether the vehicle is located in a limited area which is specified by an external control device which is embodied as a local infrastructure unit. After a position of the vehicle has been detected in the specified limited area, a wireless connection to the local infrastructure control unit is established by the vehicle-mounted control unit via a remote-control interface of the vehicle in order to control the autonomous driving process, and the vehicle is remote-controlled by the local infrastructure control unit.

The object therefore arises of increasing the safety during a parking process, a process of moving into or out of a parking space, which is assisted or carried out by a parking assistance device.

This object is achieved by the subjects of the independent patent claims. Advantageous embodiments can be found in the dependent patent claims, the description and the figures.

The invention relates to a method for operating a parking assistance device of a motor vehicle with a series of method steps. One method step is here learning a parking trajectory between an initial position and a parked position of the vehicle by means of a computer unit of the parking assistance device in the case of parking which is controlled by a driver of the motor vehicle. The parking here can comprise moving into and/or out of a parking space. For example, the initial position can be detected here by means of a user input of the driver, for example when the latter activates a learning mode of the parking assistance device in order to learn the parking trajectory. However, the initial position can also be determined subsequently for example by a length of the parking trajectory starting from a parked position. The parking trajectory can be learnt here as described, for example, in known methods.

It is important here that, as a further method step, the computing unit carries out checking to determine whether the learnt parking trajectory runs over public or private land in at least one respective section, that is to say one or more respective sections. During the checking, the learnt parking trajectory can therefore be divided into different sections which each completely run over public land or over private land. The corresponding sections can be referred to here, for example, as public sections and private sections. A further method step is here driverless parking of the motor vehicle controlled by the computing unit, along the parking trajectory exclusively in a section of the checked parking trajectory which runs over private land. The driverless parking therefore takes place exclusively in the private sections or the private section. Driverless parking of the motor vehicle can be understood here to be parking of the motor vehicle during which the driver is not located in the motor vehicle. Driverless parking can basically also be understood to be automated parking, in particular according to the SAE Automation Level 3 or higher. Basically, in this context the driver can also be present in the vehicle, what is decisive is that the driver does not assume any control function for the motor vehicle during the driverless parking. Therefore, fully automated parking is made possible exclusively when driving over private land, the private sections.

The public sections of the parking trajectory can be deleted here, for example, from the parking trajectory so that in future the parking trajectory between a then updated initial position and a parked position runs completely over private land. It is also possible that only partially automated parking, that is to say assistance of the driver by the parking assistance device, in particular with the SAE Automation Level 2 or lower, is carried out for the public sections of the checked parking trajectory.

This has the advantage that on the one hand driverless driving of the motor vehicle on public land, for example on a public road, which is possibly not legal depending on the respective jurisdiction, is avoided. In this case, the proposed method avoids legal problems for the driver or owner of the motor vehicle. In addition, in general in the case of driverless parking of the motor vehicle the speed of the motor vehicle is reduced to a great extent, which can irritate other participants in public road traffic and correspondingly cause congestion or even an accident. This is avoided by the proposed method so that the safety in road traffic is increased. This is advantageous both in the case of moving into and moving out of a parking space.

In one advantageous embodiment there can be provision in this context that during the checking on the basis of map information of a navigation unit of the parking assistance device and/or on the basis of surroundings information of a surroundings sensor unit of the parking assistance device, in particular camera information of a camera unit and/or position information of a position-detection unit of the parking assistance device and/or a user input of an input unit of the parking assistance device, it is detected whether the parking trajectory runs over public or private land in the respective section. The position-detection unit can comprise, for example, a global positioning system module (GPS module) or a similar module. The camera information can be used to detect private or public land, in that, for example, a specified road marking which is generally present on public roads but not on private roads is detected. It is also possible to detect private land as such, for example by detecting an entry or a gate.

A respective combination of the different information during the checking process is particularly advantageous. For example, although road markings are typically not present on private roadways of detached houses, they are so in private residential developments. In this context, position information can still help to assign a detected road marking to private land. Moreover, for example from a combination of the position information with map information it is possible to estimate in an improved fashion whether or not a current position of the motor vehicle and therefore a corresponding section of the parking trajectory lies on public land or runs over it. This is generally contained in the map information. The parking trajectory can therefore be compared with the map information so that the parking trajectory can be linked to the global information stored in the map. For instance, the position information of a GPS module can be combined with position information, for example odometry information, from vehicle-internal modules, in order to determine an even more precise parking trajectory.

The checking of the parking trajectory with respect to private or public land can also be improved or performed by means of a user input. Therefore, for example a user input can define private or public land or confirm the result of the checking. In this context, a user input can also be provided during the learning process, the result that even during the learning of the parking trajectory the latter is marked as running over private or public land.

This has the advantage that it can be particularly reliably detected whether the parking trajectory runs over public or private land in the respective section.

In particular it can also be provided here that during the checking the computing unit determines, from the surroundings information, a traffic volume for the respective section, and a section is detected as running over public land if the traffic volume determined for the section is higher than a predefined limiting traffic volume. The traffic volume can be determined, for example, by storing the number of dynamic objects in the surroundings for the respective sections of the trajectories. Basically it can be assumed here that more dynamic objects, that is say other traffic participants such as, in particular, motor vehicles, are present on public land than on private land. This has the advantage that the method is increased once more in accuracy and moreover the irritation of other traffic participants which is mentioned at the beginning can be prevented.

In this context it can preferably be provided that during the learning in the respective section of the parking trajectory, the traffic volume is determined and the limiting traffic volume is specified as a function of the traffic volume detected during the learning process.

This has the advantage that the detection of public or private land is improved once more, since basically the traffic volume can also vary to a great extent on public land, for example as a function of a respective residential area.

For the detection of the traffic volume it is respectively also possible to use a corresponding cross-traffic sensor unit of the parking assistance system which serves to detect traffic participants which are crossing a travel path of the motor vehicle. If the cross traffic exceeds a predefined quantity, the assigned land can be detected as public land.

In one advantageous embodiment there is provision here that partially autonomous parking which is monitored by the driver is carried out in a section of the checked parking trajectory which runs over public land.

This has the advantage that the above-mentioned advantages of the increased safety are accompanied by increased comfort, since the driver can still already give up at least part of the control of the parking process at an early time.

In a further advantageous embodiment there is provision that the checking is carried out during the learning process, and in particular it is signaled to the driver whether that section of the parking trajectory which is currently being traveled along runs over public or private land. In this context, the driver can preferably be informed by the parking assistance device that the corresponding section of the parking trajectory which runs over the public land cannot be used for driverless parking. The respective section of the parking trajectory which runs over private land can be retained here and/or the part of the parking trajectory which runs over public land can be rejected. Instead of rejecting the section of the parking trajectory which runs over public land it is possible to store said trajectory in a memory. In this case there can be provision that the motor vehicle is allowed to drive on the public section of the parking trajectory only after confirmation by the driver. Correspondingly, the initial position of the learnt parking trajectory can be shifted along said trajectory until it lies on private land, or a stopping point can be added to the trajectory.

This has the advantage that the corresponding awareness of the driver about possibilities and dangers of the assisted parking is increased and therefore the safety when parking is increased further.

In a further advantageous embodiment there is provision that the driver is not in the vehicle during the driverless parking. Operational safety can be increased here by monitoring the driverless parking with a dead man's switch outside the motor vehicle.

This has the advantage that the comfort and flexibility are increased for the driver.

In a further advantageous embodiment there is provision that the driver can interrupt the driverless parking, and in particular in the event of an interruption the current position of the motor vehicle on the parking trajectory that is assumed by the motor vehicle is stored as a stopping point and/or new final position, that is to say an initial position or parked position, of the parking trajectory In this context, the new final position can be stored as a position which is associated with the private land. This can be taken into account during a subsequent further learning process for the trajectory. Alternatively or additionally, the initial position of the parking trajectory can also be shifted automatically by the parking assistance device along the parking trajectory until the parking trajectory runs completely over private land.

This has the advantage that the safety is increased further and undesired driverless driving onto public land can be prohibited by the driver in a current situation, but with effect for future situations.

In a further advantageous embodiment there is provision that the public land comprises a public roadway and in particular the private land comprises a private roadway. In both cases, a roadway can preferably comprise a road and/or a car park.

In this case, the limitation of the driverless parking to the private land is particularly advantageous, since a large amount of traffic is to be expected on a public roadway, particular on roads or car parks, and therefore the driverless parking can irritate and endanger other traffic participants.

The invention also relates to a parking assistance device for a motor vehicle, having a computing unit for learning a parking trajectory between an initial position and a parked position of the motor vehicle in the case of parking which is controlled by a driver of the motor vehicle. It is important here that the computing unit is designed to check whether the learnt parking trajectory runs over public land or over private land in at least one respective section, and to enable and/or carry out driverless parking of the motor vehicle along the parking trajectory exclusively in a section of the checked parking trajectory which runs over private land.

Advantages and advantageous embodiments of the parking assistance device correspond here to advantages and advantageous embodiments of the described method.

The invention also relates to a motor vehicle having such a parking assistance device.

The features and combinations of features that are cited in the description above and also the features and combinations of features that are cited in the description of the figures below and/or as shown in the figures alone can be used not only in the respectively indicated combination but also in other combinations without departing from the scope of the invention. Embodiments of the invention that are not explicitly shown and explained in the figures, but emanate and are producible from the explained embodiments by virtue of self-contained combinations of features, are therefore also intended to be regarded as included and as disclosed. Embodiments and combinations of features are also considered to be disclosed which therefore do not have ail the features of an originally formulated independent claim. Furthermore, embodiments and combinations of features that go beyond or differ from the combinations of features set out in the back-references of the claims or differ therefrom, should be considered to be disclosed, in particular by the embodiments set out above.

Figure 2:
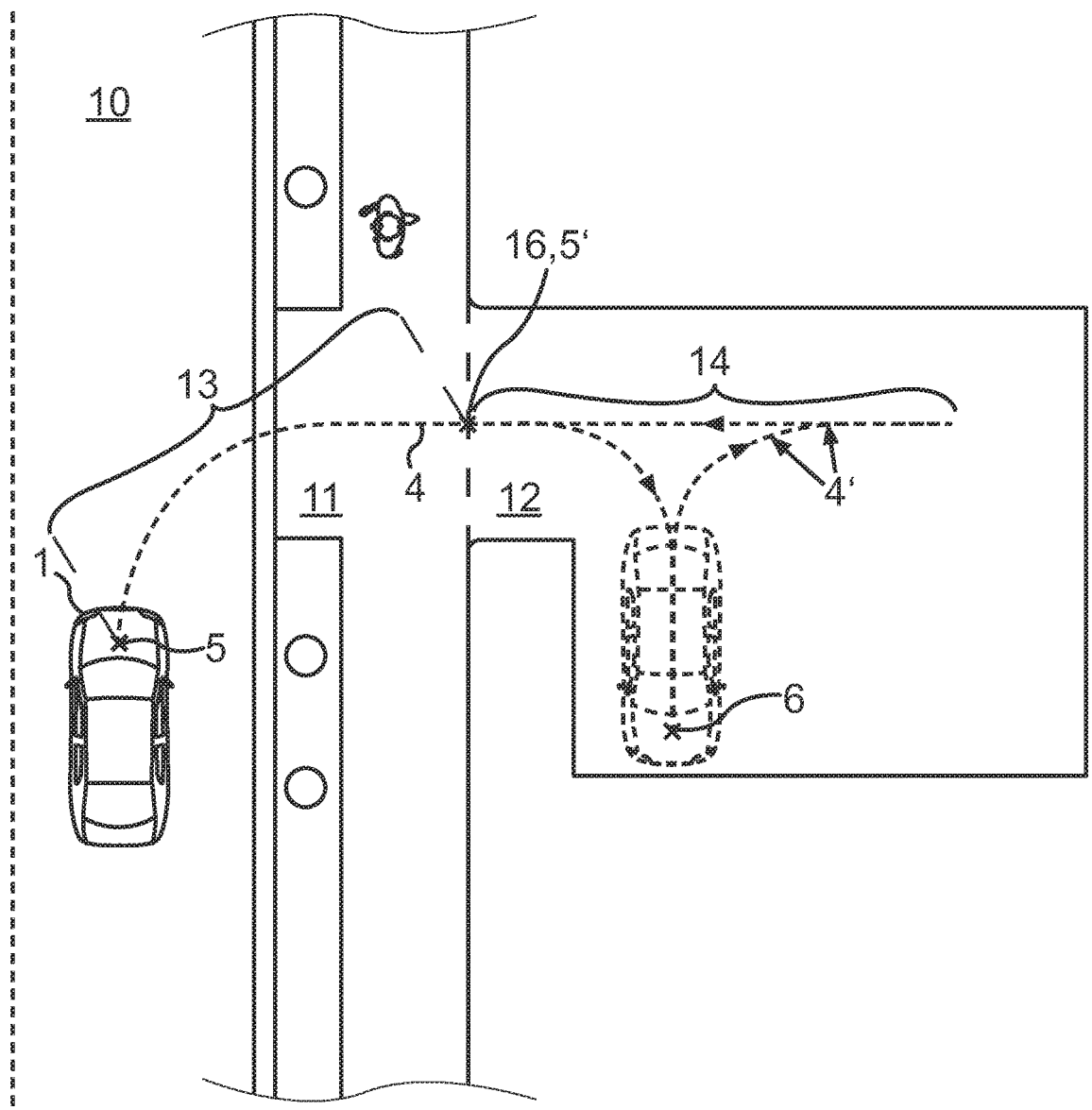

Exemplary embodiments of the invention are explained in more detail below with reference to schematic drawings. In the figures:

FIG. 1 shows a motor vehicle having an exemplary embodiment of a parking assistance device, in a first exemplary scenario; and FIG. 2 shows the motor vehicle from FIG. 1 in a second exemplary scenario.

In the figures, identical or functionally identical elements are provided with the same reference signs.

FIG. 1 illustrates a motor vehicle 1 with an exemplary embodiment of a parking assistance device 2. The parking assistance device 2 has in this case here a computing unit 3 for learning a parking trajectory 4 between an initial position 5 and a parked position 6 of the motor vehicle 1 during parking which is controlled by a driver of the motor vehicle 1. In addition, the parking assistance device 2 here also has a navigation unit 7 for making available map information to the computing unit 3, and in this example also a position-detection unit 8 which is assigned to a global position-determining system 15 and has the purpose of making available position information of the motor vehicle 1 to the computing unit 3. Finally, the parking assistance device 2 also has here a surroundings sensor unit 9, which is embodied here as a camera and therefore makes available surroundings information about a surrounding area 10 of the motor vehicle 1 in the form of camera information to the computing unit 3.

In the present case, the parking trajectory 4 has already been learnt in a preceding parking process of the motor vehicle 1, which a driver has carried out, between the initial position 5 and the parked position 6. In the example shown, the trajectory runs here partially over public land 11, in the present case a public road, and over private land 12, in the present case a private road in the form of an entry. In the exemplary scenario shown, the driver would then like to trigger an automatic parking process at the initial position 5, this being driverless parking of the motor vehicle 1 along the parking trajectory 4. In this context, or already during the learning of the parking trajectory 4, the computing unit 3 detects, in the present case on the basis of the information which is made available, specifically here the map information and the surroundings information, the camera information and the position information, whether the parking trajectory 4 in respective sections 13, 14 runs over public land 11 or private land 12. In the present case, the parking trajectory 4 runs over public land 11 in a first section 13, a public section 13, and over private land 12 in a second section 14, a private section 14.

Correspondingly, the computing unit of the parking assistance device 2 and therefore the parking system 2 itself will not permit or carry out the driverless parking starting from the initial position 5 but rather, for example, in the present case inform the driver that the corresponding function cannot yet be activated and that he must still retain control over the motor vehicle 1, for example in a partially assisted driving mode, until the private section 14 is reached. Therefore, the driver can control the motor vehicle in the parking process, for example up to a further position 16, and then allow the motor vehicle 1 to park in a driverless fashion along the parking trajectory 4 from the further position 16 in the private section 14 in a driverless fashion.

In this context, for example the new position 16 can be defined as a new initial position 5'. Then, for example the assisted parking is of course possible only from this new initial position 5'.

FIG. 2 illustrates the motor vehicle 1 from FIG. 1 in a further exemplary scenario. For reasons of clarity, the parking assistance device 2 (FIG. 1) is not illustrated here. In the present case, the parking trajectory 4 runs from the initial position 5 to the parked position 6 from a road as the public land 11 via a sidewalk onto a private car park 12 as private land. The parking trajectory 4 also comprises here an equivalent alternative trajectory as an additional parking trajectory 4' which differs from the original parking trajectory 4 which is learned during the parking of the motor vehicle 1 from the parking position 5 into the parked position 6. The additional parking trajectory 4' comes about through driverless manoeuvring on the private land 12, during which the motor vehicle 1 is turned out of the initial position 6 during the process of moving out of a parking space so that when the motor vehicle 1 leaves the private section 13 it is oriented in a reversed fashion with respect to its orientation during the movement into the parking space.

The proposed method ensures here that during driverless movement out of the parked position 6 the vehicle is not driven in a driverless fashion onto the public land 11. For example, automatic stopping of the motor vehicle 1 can be provided here at the further position 16 at which the parking trajectory 4 merges with the public section 14, with the result that during the movement out of the parking space the motor vehicle 1 does not drive in a driverless fashion onto the possibly busy public land.

The invention claimed is:

1. A method for operating a parking assistance device of a motor vehicle, comprising:
   learning a parking trajectory between an initial position and a parked position of the motor vehicle by a computing unit of the parking assistance device in a case of parking which is controlled by a driver of the motor vehicle;
   checking whether the learnt parking trajectory runs over public land or over private land in at least one respective section; and
   driverless parking of the motor vehicle along the parking trajectory exclusively in a section of the checked parking trajectory which runs over private land,
   wherein when the driver interrupts the driverless parking, a current position of the motor vehicle on the parking trajectory is stored as a new final position of the parking trajectory.

2. The method as claimed in claim 1, further comprising:
   during the checking on a basis of map information of a navigation unit and/or on a basis of surroundings information of a surroundings sensor unit comprising camera information of a camera unit and/or position information of a position-detection unit and/or a user input of an input unit, detecting whether the parking trajectory runs over public or private land in the respective section.

3. The method as claimed in claim 2, further comprising:
   during the checking the computing unit determines, from the surroundings information, a traffic volume for the respective section, and a section is detected as running over public land when the traffic volume is higher than a predefined limiting traffic volume.

4. The method as claimed in claim 3, further comprising:
   during the learning process the traffic volume in the respective section of the parking trajectory is determined and the limit traffic volume is predefined as a function of the traffic volume detected during the learning process.

5. The method as claimed in claim 1, wherein partially autonomous parking which is monitored by the driver is carried out in a section of the checked parking trajectory which runs over public land.

6. The method as claimed in claim 1, wherein the checking is carried out during the learning process, and it is signaled to the driver whether that section of the parking trajectory which is currently being traveled along runs over public or private land.

7. The method as claimed in claim 1, wherein the driver is not in the motor vehicle during the driverless parking.

8. The method as claimed in claim 1, wherein the public land comprises a public roadway, a road and/or a car park, and the private land comprises a private roadway.

9. A parking assistance device for a motor vehicle, the parking assistance device comprising:
   a computing unit for learning a parking trajectory between an initial position and a parked position of the motor vehicle in the case of parking controlled by a driver of the motor vehicle,
   wherein the computing unit is configured to check whether the learnt parking trajectory runs over public land or over private land in a respective section, and to enable driverless parking of the motor vehicle along the parking trajectory exclusively in a section of the checked parking trajectory which runs over private land, and
   wherein the driver interrupts the driverless parking, and in the event of an interruption the current position of the motor vehicle on the parking trajectory is stored as a new final position of the parking trajectory.

10. A motor vehicle with a parking assistance device as claimed in claim 9.

* * * * *